(12) United States Patent
Aigner et al.

(10) Patent No.: US 8,889,207 B2
(45) Date of Patent: Nov. 18, 2014

(54) STEAM FUNCTION AT THE END OF A BREWING PROCESS

(75) Inventors: Andreas Aigner, Siegsdorf (DE); Josef Daburger, Siegsdorf/Hammer (DE); Josef Gius, Traunwalchen (DE); Johann Magg, St. Georgen (DE); Stefan Stadler, Truchtlaching (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 318 days.

(21) Appl. No.: 12/225,450

(22) PCT Filed: Jan. 15, 2008

(86) PCT No.: PCT/EP2008/050368
§ 371 (c)(1),
(2), (4) Date: Feb. 25, 2010

(87) PCT Pub. No.: WO2008/092734
PCT Pub. Date: Aug. 7, 2008

(65) Prior Publication Data
US 2010/0233337 A1    Sep. 16, 2010

(30) Foreign Application Priority Data

Feb. 1, 2007  (DE) .......................... 10 2007 005 105
Jul. 11, 2007  (DE) .......................... 10 2007 032 288

(51) Int. Cl.
A47J 31/54     (2006.01)
A47J 31/60     (2006.01)
A47J 31/40     (2006.01)

(52) U.S. Cl.
CPC ................ *A47J 31/60* (2013.01); *A47J 31/407* (2013.01)
USPC ........... 426/433; 426/431; 426/435; 426/112; 426/115; 426/432; 99/302 R; 99/281; 99/300; 99/289 R; 99/293; 99/275

(58) Field of Classification Search
CPC .......... A47J 31/465; A47J 31/54; A47J 31/30
USPC .................. 426/431, 433, 435, 112, 114, 432
See application file for complete search history.

(56) References Cited

U.S. PATENT DOCUMENTS

| | | | | |
|---|---|---|---|---|
| 4,083,295 | A | * | 4/1978 | Hollingsworth ................ 99/283 |
| 4,353,293 | A | * | 10/1982 | Illy ................................ 99/283 |
| 6,405,637 | B1 | | 6/2002 | Cai |
| 2005/0279215 | A1 | | 12/2005 | Cai |
| 2007/0044664 | A1 | | 3/2007 | Wang |

FOREIGN PATENT DOCUMENTS

DE        3133903 C1    11/1982
WO    WO 2006/000961      1/2006

OTHER PUBLICATIONS

International Search Report PCT/EP2008/050368.
DE Search Report 10 2007 005 105.2-16.

* cited by examiner

*Primary Examiner* — Humera Sheikh
*Assistant Examiner* — Hong T Yoo
(74) *Attorney, Agent, or Firm* — Laurence A. Greenberg; Werner H. Stemer; Ralph E. Locher

(57) ABSTRACT

A method for preparing hot beverages in a hot beverage machine by possibly repeatedly pumping a specific quantity of water from a water tank into a heating device, heating the quantity of water, pumping the heated quantity of water out of the heating device into a brewing chamber and possibly at the same time pumping a further quantity of water out of the water tank into the heating device, brewing a brewing substance contained in the brewing chamber to produce a hot beverage, and finally converting the quantity of water last pumped into the heating device completely into steam in a controlled manner for forcing liquid out of the entire line system downstream of the heating device.

21 Claims, 2 Drawing Sheets

STEAM FUNCTION AT THE END OF A BREWING PROCESS

BACKGROUND OF THE INVENTION

The present invention relates to a method for preparing hot beverages in a hot beverage machine wherein, in a first step, a specific volume of water is pumped from a water reservoir into a heating apparatus. In a second step, said volume of water is heated in the heating apparatus. In a third step, the heated volume of water is pumped out of the heating apparatus into a brewing chamber and at the same time a further volume of water is pumped from the water reservoir into the heating apparatus. In a fourth step, a brewing substance contained in the brewing chamber is brewed to produce a hot beverage. In this scheme the steps do not necessarily have to be executed at intervals separated from one another, but can also take place overlapping in time or simultaneously. The steps are therefore to be understood essentially as a definition of one component of a method in each case. The steps can also be performed several times over during one preparation process. The hot beverage machine can be a pod coffee machine, for example.

U.S. Pat. No. 6,405,637 B1 discloses a filter coffee machine which operates in principle according to the method described above. A valve which is open only when a coffee receptacle is placed under it is disposed in the filter outlet and prevents coffee from dripping out of the filter used after the receptacle has been removed.

BRIEF SUMMARY OF THE INVENTION

The object of the present invention is to develop a hot beverage machine in such a way that after-dripping at the beverage outlet at the end of a brewing process is avoided even without a valve.

This object is achieved by means of the features of claim 1, whereby in a generic hot beverage machine the delivery rate of the pump and/or the power output of the heating apparatus at the end of a beverage preparation process is selectively controlled such that the last volume of water pumped into the heating apparatus is converted almost entirely into steam. On completion of the preparation process, therefore, the final volume of water is deliberately converted as completely as possible into steam. The method can preferably be performed with continuous-flow heaters which are typically operated at a high surface temperature of over 100° Celsius. If, namely, the pump ceases to deliver any more cold water and consequently does not cool down the heated surface, the final water evaporates in the heating apparatus. The expansion associated with the formation of steam then forces, with at least some of the generated steam, all fluids such as water and/or residues of the hot beverage from all fluid-conducting components of the hot beverage machine that are connected downstream of the heating apparatus. As a result, no beverage or water can continue seeping or dripping from the beverage outlet after the preparation process has terminated.

The heating apparatus preferably remains permanently switched on during the entire preparation process. This saves unnecessary switching operations of the heating apparatus. The pump can either operate in a pulsed manner at time intervals, in other words in a pulse-pause ratio. Accordingly, an operating interval (pulse), in which the pump is running, is followed in alternation by a pause interval (pause). During the pause intervals the heating apparatus heats the volume of water contained therein to a specific brewing temperature. By means of corresponding control the pump conveys the water heated to brewing temperature in an accurately timed manner from the heating apparatus into the brewing chamber and at the same time delivers new cold water from the water reservoir into the heating apparatus. This is because generating steam during the brewing or preparation process is not desirable per se. That is to say the best brewing result is achieved at a brewing temperature of the water that is significantly below the boiling temperature; temperatures above the optimal brewing or even boiling temperature, on the other hand, can have a negative effect on the releasing of the flavor of the hot beverage.

Alternatively, the pump can also operate continuously while the heating apparatus is switched on. The pump delivery rate then effects a water velocity through the heating apparatus that enables the water to be heated to the required temperature. The pump then conveys the water continuously further from the heating apparatus into the brewing chamber. The continuous pump operation eliminates unnecessary switching operations of the pump and therefore increases its service life. Accordingly, the heating capacity is dependent on the original temperature of the water, the desired brewing temperature and the volumetric flow of the water. In order to adjust the heating capacity to changes in said parameters, its power output can be regulated accordingly or the heating apparatus can be operated in clocked mode.

At the end of the preparation process the heating apparatus is not systematically pumped empty, but instead the pump and the heating apparatus are switched off essentially simultaneously. As a result, a residual amount of water can remain in the heater. Since the heating apparatus now still has sufficient residual heat owing to its high operating temperature, the final volume of water contained in the heating apparatus is heated completely to beyond the boiling point. Water vapor is therefore produced in the heating apparatus, and along with it, due to the associated increase in volume, pressure which leads to a brief burst of steam. Because of the pressure all fluid residues are forced out of the heating apparatus itself and out of the tubes disposed downstream thereof as well as out of the brewing chamber and a pod or capsule contained therein. If the machine has further components, such as e.g. a frothing chamber or an outlet, these are likewise completely emptied. Since the entire volume of water evaporates in the heating apparatus and empties the downstream tubes under pressure, no water can continue to drip after preparation of the beverage has been completed. Moreover, each beverage is brewed with freshly heated water. The use of germ-infested residual water from the beverage machine for beverage preparation can be virtually ruled out.

In addition to evacuating fluids, the forcing-through of steam also has a cleaning and/or disinfecting effect. This leads to improved hygiene, in particular if the coffee-making machine is not used for some time.

A further advantage is the drying effect. The steam blasts previously remaining fluid residues out of the tubes of the brewing chamber and above all out of the pod or capsule contained therein. Since the pod or capsule is replaced manually by an operator, a considerable improvement in convenience is associated therewith, since no more residual water is present when the pod or capsule is removed and in particular it is more pleasant to remove a dried pod than a wet one. Thus, soiling, as would occur e.g. when carrying a wet, dripping pod from the coffee machine to a garbage container, is largely ruled out.

The method can be used both with pod machines and with machines for beverage capsules. Like pods, the capsules can contain a solid brewing substance in powder form. Alternatively, they can be filled with a liquid brewing concentrate or soluble powder. The hot beverage is then produced by diluting the concentrate or powder solution with hot water. The latter is injected into the capsule during beverage preparation and flushes out the concentrate or powder.

The intensity of the burst of steam can be controlled by means of the time at which the heater is switched off relative to the pump. An increase in intensity can be achieved by switching off the heater with a time delay relative to the pump. According to an advantageous embodiment of the invention, the pump can be switched off with a time delay relative to the heating apparatus. In this way the burst of steam can be moderated in terms of its effect, thus causing expelled water to shoot out less rapidly from the outlet and spurting as a consequence.

The intensity of the burst of steam can then also be influenced by way of the characteristic of the heating or pumping capacity at the time of switching off. If, for example, the heater is switched off immediately and the power output of the pump is not switched off completely immediately, but is reduced slowly, the burst of steam can likewise be moderated in this way. Conversely, it can be increased if the heating power output is stepped back continuously from the time at which the pump is switched off. Thus, the burst of steam can be controlled in a more graduated manner by means of both controls than only by way of the times at which heater and pump are switched off.

According to a further advantageous embodiment of the invention, the forcing-through of steam at the end of the brewing process can also be used to clean one or more filters located in the fluid feed tube upstream of, downstream of or in the brewing chamber. Regular cleaning of such filters lengthens their useful life and at the same time reduces the number of maintenance intervals. In particular when a plurality of filters are arranged in succession or stacked one above the other, or in the case of multi-layer filters, this ensures not only the cleaning but also the emptying of chambers between the filters at the end of each preparation process.

BRIEF DESCRIPTION OF THE DRAWINGS

The sequence of steps in the inventive preparation method of a beverage machine is explained below by way of example with reference to a drawing, in which.

DETAILED DESCRIPTION OF THE PRESENT INVENTION

Figure 1:
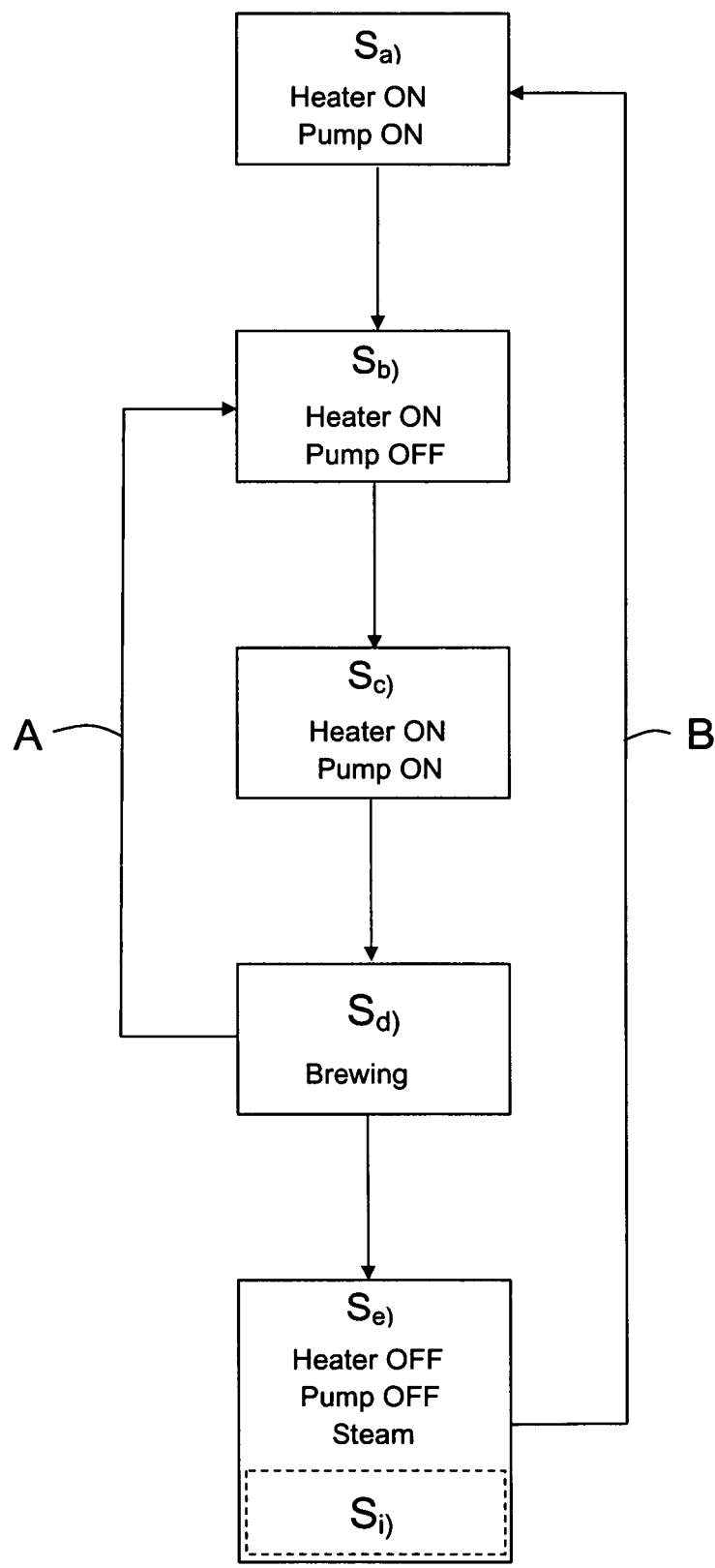
FIG. 1: is a block diagram representing a pulse-pause mode of operation of the pump.

The block diagram according to FIG. 1 shows five method steps $S_{a)}$, $S_{b)}$, $S_{c)}$, $S_{d)}$ and $S_{e)}$ of a method of operation of a beverage machine. An additional method step which is executed during step $S_{e)}$ is designated by $S_{f)}$. Since step $S_{f)}$ is only carried out if the machine also has filters, it is surrounded by a dashed line.

In step $S_{a)}$, a pump is switched on at the instigation of a control device following input of a request for a beverage. The pump pumps water from a water reservoir into a heating apparatus. The heating apparatus is also switched on. Subsequently the pump is switched off again, while the heating apparatus remains switched on.

During step $S_{b)}$, the water in the heating apparatus is heated to a brewing temperature. At the same time the temperature in the heating apparatus is monitored by the control device by means of an NTC resistor which is disposed in or on the heating apparatus. Different brewing temperatures can be stored in the control device for different beverages.

After the brewing temperature has been reached, the control device switches the pump on again (step $S_{c)}$), while the heating apparatus remains switched on. As a result the hot water at brewing temperature is pumped from the heating apparatus into a brewing chamber. Meanwhile the heating apparatus is refilled with cold water from the water reservoir. As soon as the heating apparatus is full, the pump is switched off again.

In the brewing chamber, the hot water at brewing temperature now has time to react with a brewing substance contained therein. The brewing substance is brewed to a first partial amount of hot beverage (step $S_{d)}$) which leaves the brewing chamber through an outlet and flows into a beverage container.

Steps $S_{b)}$, $S_{c)}$ and $S_{d)}$ are repeated until a volume of water stored in the control device for the desired beverage has been reached. The repetition is symbolized by the arrow A.

At the end of the preparation process, in step $S_{e)}$, the controller modifies the control of pump and heater; they are both permanently switched off. Owing to the residual heat in the heating apparatus and the remaining pumping-out of the heated water, its temperature now continues increasing in the heating apparatus beyond the brewing temperature up to and above the boiling point.

This causes water vapor to be produced in the heating apparatus, as a result of which the system pressure increases simultaneously. This effect is used to force water still contained in the tubes or remains of the hot beverage contained in the brewing chamber to be forced out completely under pressure through the outlet. Furthermore, filters which may be disposed e.g. in the tubes or in the region of the brewing chamber can be cleaned in the process (step $S_{f)}$).

In the machine there thus remain no fluid residues which can lead to deposits forming, particularly in the case of long periods out of service. The hot water vapor cleans and disinfects the components through which it flows, simultaneously drying them in the process. Drying also improves the handling of the used brewing substance pod, which in a dried state can be disposed of more easily and conveniently, since there is no annoying dripping to deal with. Moreover, the steam function at the end of the brewing process reduces the after-drip time at the outlet, inasmuch as after-dripping is not eliminated entirely. This means that the container filled with the hot beverage can be removed from the machine more quickly, thereby providing a considerable improvement in convenience.

After the new selection of a beverage, the sequence of the above-described method is repeated, as symbolized by arrow B.

Figure 2:
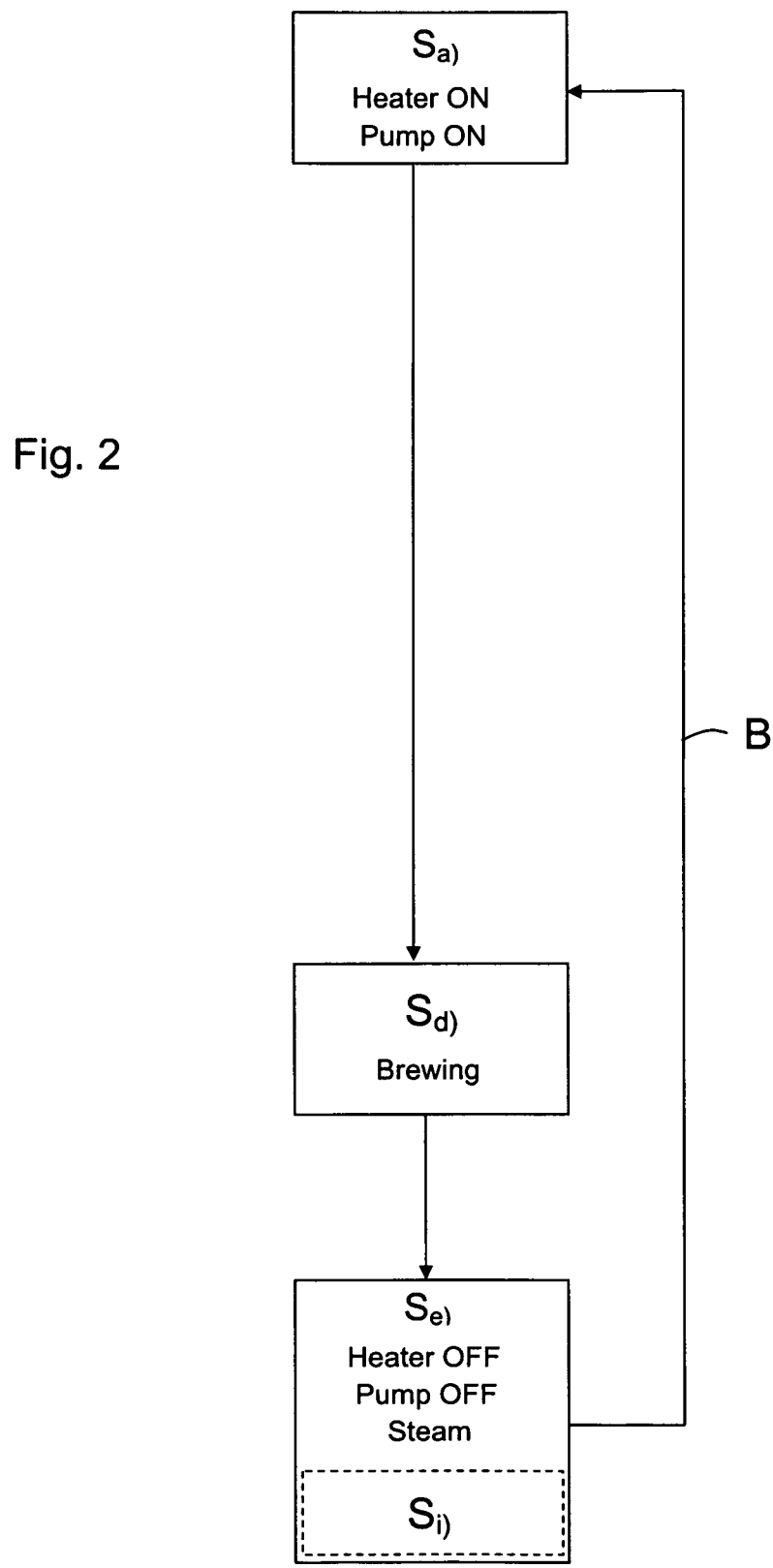
FIG. 2: is a block diagram representing a continuous mode of operation of the pump.

In contrast, the block diagram according to FIG. 2 shows a method with continuous pump operation. Contrary to the above-described method according to FIG. 1, in step $S_{a)}$, the pump pumps water continuously into the switched-on heater. The pump does not switch off again until the entire volume of water required for preparing a selected beverage has been delivered. The pumped flow of water is therefore dimensioned such that upon flowing through the heater the water is heated fully to the required temperature. Accordingly, in step $S_{d)}$, the hot water at brewing temperature for brewing the beverage is delivered continuously to a brewing chamber, thus continuing the preparation of the beverage in the above-described manner. Consequently, the brewing process $S_{d)}$ does not take place at intervals or in a flooding manner as in the method described in FIG. 1, but is characterized by a continuous inflow of water into the brewing chamber.

The invention claimed is:

1. A method for preparing beverages in a hot beverage machine, the method comprising:
   delivering a predetermined volume of water from a water reservoir into a heating apparatus;
   heating the predetermined volume of water delivered into the heating apparatus;
   advancing the heated predetermined volume of water from the heating apparatus into a brewing chamber;
   brewing a brewing substance with the heated predetermined volume of water contained in the brewing chamber to produce a beverage; and
   converting in a controlled manner a remaining volume of water pumped into the heating apparatus substantially entirely into steam in order to force substantially all the remaining volume of water out of the heating apparatus, and substantially all liquid out of a tube system downstream of the heating apparatus and the brewing chamber,
   wherein the steps of delivering, heating, advancing, and brewing are executed once or several times during one preparation process,
   the step of delivering is performed by a pump, and
   the pump being switchable between an on condition and an off condition independently from the heating apparatus being switched on and off.

2. The method as claimed in claim 1, wherein the step of converting includes switching off the pump that has delivered the predetermined volume of water in the delivering step with a time delay relative to the heating apparatus.

3. The method as claimed in claim 2, wherein the step of converting prevents any liquid from dripping from the brewing chamber after the remaining volume of water is converted into steam.

4. The method as claimed in claim 1, wherein the step of converting includes cleaning a filter.

5. The method as claimed in claim 1, wherein the step of converting prevents any liquid from dripping from the brewing chamber after the remaining volume of water is converted into steam.

6. The method as claimed in claim 1, wherein the heating apparatus is in a heating mode during the entirety of the brewing.

7. The method as claimed in claim 1, wherein the pump is operated in a pulsed manner alternating between operating intervals and pause intervals.

8. The method as claimed in claim 7, wherein the step of heating is performed while the pump is in one of the pause intervals.

9. The method as claimed in claim 8, wherein the step of advancing is performed while the pump is in one of the operating intervals.

10. The method as claimed in claim 9, wherein the step of delivering and the step of advancing are simultaneously performed while the pump is in one of the operating intervals.

11. The method as claimed in claim 10, wherein the step of converting prevents any liquid from dripping from the brewing chamber after the remaining volume of water is converted into steam.

12. The method as claimed in claim 1, wherein the pump is operated continuously during the brewing.

13. The method as claimed in claim 12, wherein the step of converting prevents any liquid from dripping from the brewing chamber after the remaining volume of water is converted into steam.

14. The method as claimed in claim 1, wherein the heating apparatus is switched off before the pump is switched off.

15. The method as claimed in claim 14, wherein a speed of the pump is reduced gradually after the heating apparatus is switched off.

16. The method as claimed in claim 15, wherein the step of converting prevents any liquid from dripping from the brewing chamber after the remaining volume of water is converted into steam.

17. The method as claimed in claim 1, wherein the pump is controlled by an electric control device,
   The heating apparatus is controlled by the electric control device, and
   the electric control device is configured to control the pump and the heating apparatus independently.

18. The method as claimed in claim 1, further comprising determining a required volume of water required for a selected beverage, the required volume being the predetermined volume.

19. Method of preparing hot beverages in a hot beverage machine, comprising:
   a) pumping a defined water quantity from a water tank into a heating device;
   b) heating the defined water quantity;
   c) pumping the heated water quantity from the heating device into a brewing chamber;
   d) brewing a brewing substance disposed in the brewing chamber with the heated water quantity, to make a hot beverage; and
   e) making a controlled conversion of a remaining volume of the water quantity, which was last pumped into the heating device, substantially completely into steam for forcing liquids out of a duct system downstream of the heating device, wherein the steps a) to d) are carried out once or several times during a preparation process.

20. Method according to claim 19, wherein, in step e) a pump is switched off with a delay in time in comparison with the heating device.

21. Method according to claim 19, wherein during step e) cleaning of filters is carried out.

* * * * *